United States Patent
Chun et al.

(10) Patent No.: US 7,215,404 B2
(45) Date of Patent: May 8, 2007

(54) LIQUID CRYSTAL DISPLAY DEVICE FREE FROM CROSS TALK AND FABRICATION METHOD THEREOF

(75) Inventors: Jin Young Chun, Seoul (KR); Seok Lyul Lee, Kyoungki-do (KR)

(73) Assignee: Boe-Hydis Technology Co., Ltd., Kyoungki-do (KR)

( * ) Notice: Subject to any disclaimer, the term of this patent is extended or adjusted under 35 U.S.C. 154(b) by 48 days.

(21) Appl. No.: 09/994,283

(22) Filed: Nov. 26, 2001

(65) Prior Publication Data

US 2002/0063840 A1    May 30, 2002

(30) Foreign Application Priority Data

Nov. 25, 2000    (KR) .............................. 2000-70707

(51) Int. Cl.
*G02F 1/1339* (2006.01)

(52) U.S. Cl. .................. 349/156; 349/155; 349/187

(58) Field of Classification Search ........ 349/155–156, 349/153, 106, 56, 39, 110, 139, 187
See application file for complete search history.

(56) References Cited

U.S. PATENT DOCUMENTS

| | | | |
|---|---|---|---|
| 3,978,580 A * | 9/1976 | Leupp et al. .................. 29/886 |
| 5,657,104 A * | 8/1997 | Kanezawa .................. 349/149 |
| 5,748,266 A * | 5/1998 | Kodate .................. 349/39 |
| 5,917,572 A * | 6/1999 | Kurauchi et al. .......... 349/156 |
| 5,973,763 A * | 10/1999 | Fujimura et al. .......... 349/156 |
| 5,982,471 A * | 11/1999 | Hirakata et al. .......... 349/155 |
| 6,067,141 A * | 5/2000 | Yamada et al. ............ 349/129 |
| 6,140,988 A * | 10/2000 | Yamada ........................ 345/88 |
| 6,166,797 A * | 12/2000 | Bruzzone et al. .......... 349/155 |
| 6,320,639 B1* | 11/2001 | Mori et al. .................. 349/155 |
| 6,323,921 B1* | 11/2001 | Kurauchi et al. .......... 349/106 |
| 6,377,328 B1* | 4/2002 | Morimoto et al. .......... 349/155 |
| 6,414,733 B1* | 7/2002 | Ishikawa et al. ............ 349/110 |
| 6,441,879 B2* | 8/2002 | Hiraishi et al. ............. 349/155 |
| 6,459,468 B2* | 10/2002 | Shibahara .................... 349/155 |
| 6,573,969 B1* | 6/2003 | Watanabe et al. .......... 349/155 |
| 2002/0012083 A1* | 1/2002 | Tanaka et al. .............. 349/106 |

(Continued)

FOREIGN PATENT DOCUMENTS

EP    1 032 014    *    8/2000

(Continued)

*Primary Examiner*—Leonardo Andujar
*Assistant Examiner*—Ahmed N. Sefer
(74) *Attorney, Agent, or Firm*—Ladas & Parry LLP

(57) ABSTRACT

A liquid crystal display device free from cross talk is disclosed. The device has a supporting column, a contact part and an electrically conductive layer. The supporting column is provided for an upper substrate and vertically extended therefrom to maintain a uniform cell gap. The contact part is provided for a common line disposed at a peripheral region outside an active area of a lower substrate. The contact part faces the supporting column at a corresponding place to guide a communication between the supporting column and the common line. And, the conductive layer is formed on surfaces of the supporting column and the upper substrate. A portion of the conductive layer on the supporting column is joined to the common line within the contact part to establish a signal interconnection between the lower substrate and the upper substrate. A related fabrication method is also disclosed.

5 Claims, 6 Drawing Sheets

U.S. PATENT DOCUMENTS

2002/0039166 A1* 4/2002 Song .......................... 349/156
2005/0110922 A1* 5/2005 Lee et al. ................... 349/106
2006/0227280 A1* 10/2006 Tawaraya et al. ........... 349/158

FOREIGN PATENT DOCUMENTS

| JP | 10-268356 | * | 10/1998 |
| JP | 11-84394 | * | 3/1999 |
| JP | 2001-5006 | * | 1/2001 |
| JP | 2001-100217 | * | 4/2001 |
| WO | WO 99/08151 | * | 2/1999 |

* cited by examiner

LIQUID CRYSTAL DISPLAY DEVICE FREE FROM CROSS TALK AND FABRICATION METHOD THEREOF

BACKGROUND OF THE INVENTION

1. Field of the Invention

The present invention relates generally to a liquid crystal display (LCD) device. More particularly, the present invention relates to a thin film transistor (TFT) LCD device and a fabrication method thereof, in which a cross talk caused by an alteration of an electric field is prevented.

2. Description of the Prior Art

As widely known in the art, the TFT LCD device is a typical electronic display device functioning by deformation of liquid crystal molecules according to the electric field between confronting electrodes on lower and upper substrates. In the TFT LCD device, the upper substrate usually referred as a color filter substrate maintains a uniform voltage by mostly receiving signals from the lower substrate usually referred as an array substrate.

To provide such signals to the upper substrate, a so-called transfer is currently used for interconnection between the lower and upper substrates. The interconnection transfer is generally located between outer lead bonding pads of an LCD panel or at a peripheral region outside an active area, and also penetrates a liquid crystal layer.

However, this may cause a difference in voltage between central and peripheral regions in the entire panel. That is, a common signal is differently provided to each color filter region, so that undesirable cross talk is generated while degrading the quality of a screen of the LCD panel.

On the other hand, as another factor in good quality of the screen, the liquid crystal layer should have a uniform cell gap between the lower and upper substrates. One of conventional solutions to satisfy this requisite is to use a spacer ball 30 shown in FIG. 1. Referring to FIG. 1, the spacer ball 30 is interposed between the lower and upper substrates 10 and 20, thus uniformly maintaining the gap therebetween.

Such a conventional solution using the spacer ball has, however, some drawbacks. For example, since the spacer ball is only several microns in diameter, variations of diameter may often happen. In addition, due to the movement of grains in the spacer ball, a photoalignment layer may be destroyed or the grains may be agglomerated. Besides, the use of the spacer ball may cause the leakage of light. Unfortunately, these drawbacks may result in bad problems such as poor display and low contrast ratio. To solve these problems, various approaches such as the coloring of the spacer ball, the development of a fixed spacer, or the increase in hardness of the ball have been made, but satisfactory results have been not given.

Recently, one way has been proposed to overcome the drawbacks of the conventional spacer ball. The way is, as shown in FIG. 2, to form a supporting column 40 under the upper substrate 20. The supporting column 40 is made of photosensitive polyimide, photosensitive acrylic acid resin, photosensitive coloring resin, or photoresist by using a photolithography process. Generally, the supporting column has a trapezoid body shape and a round tip.

FIG. 3 illustrates a conventional LCD device employing a supporting column 32. As depicted in FIG. 3, a color filter layer 22 and a black matrix 23 are formed under a glass board 24 for the upper substrate. Next, indium tin oxide (ITO) layers 16 and 21 are formed respectively on a glass board 12 for the lower substrate and under the upper glass board 24. The supporting column 32 is then formed through the liquid crystal layer 26 by using the above-mentioned material and process. The supporting column 32 is placed at every pixel, and preferably disposed at a red or blue region.

SUMMARY OF THE INVENTION

It is therefore an object of the present invention to provide a liquid crystal display device and a fabrication method thereof, which, without employing a conventional spacer ball as well as a conventional interconnection transfer, can maintain a uniform cell gap and also realize a signal interconnection between lower and upper substrates.

Another object of the present invention is to provide a liquid crystal display device and a fabrication method thereof in which a cross talk is prevented by entirely applying an electric field to an upper substrate.

Still another object of the present invention is to provide a liquid crystal display device and a fabrication method thereof without requiring a conventional dotting process for forming an interconnection transfer, thereby reducing fabrication cost.

To achieve these and other objects in accordance with the present invention, a liquid crystal display device that comprises a supporting column, a contact part and an electrically conductive layer is provided. The supporting column is provided for an upper substrate and vertically extended from the upper substrate so as to maintain a uniform cell gap. The contact part is provided for a common line disposed at a peripheral region outside an active area of a lower substrate confronting the upper substrate. The contact part faces the supporting column at a corresponding position so as to guide a communication between the supporting column and the common line. And, the electrically conductive layer is formed on surfaces of the supporting column and the upper substrate. A portion of the electrically conductive layer on the supporting column is joined to the common line within the contact part so as to establish a signal interconnection between the lower substrate and the upper substrate.

Preferably, an insulating layer may be further provided for the common line, and the contact part may be a contact hole formed in the insulating layer so as to expose a portion of the common line.

According to another aspect of the present invention, a method for fabricating a liquid crystal display device is provided. In the method, a supporting column is provided for an upper substrate, wherein the supporting column is vertically extended from the upper substrate so as to maintain a uniform cell gap. Then an electrically conductive layer is formed on surfaces of the supporting column and the upper substrate. In addition, a contact part is provided for a common line disposed at a peripheral region outside an active area of a lower substrate confronting the upper substrate, wherein the contact part faces the supporting column at a corresponding position. Finally, the lower substrate and the upper substrate are united so that a portion of the electrically conductive layer on the supporting column is joined to the common line within the contact part. Accordingly, a signal interconnection is established between the lower substrate and the upper substrate.

Preferably, the providing of the contact part may include providing an insulating layer for the common line and forming a contact hole in the insulating layer so as to expose a portion of the common line. Furthermore, the electrically conductive layer may include an indium tin oxide (ITO) layer.

DETAILED DESCRIPTION OF THE INVENTION

The present invention will be now described more fully hereinafter with reference to accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Figure 1:
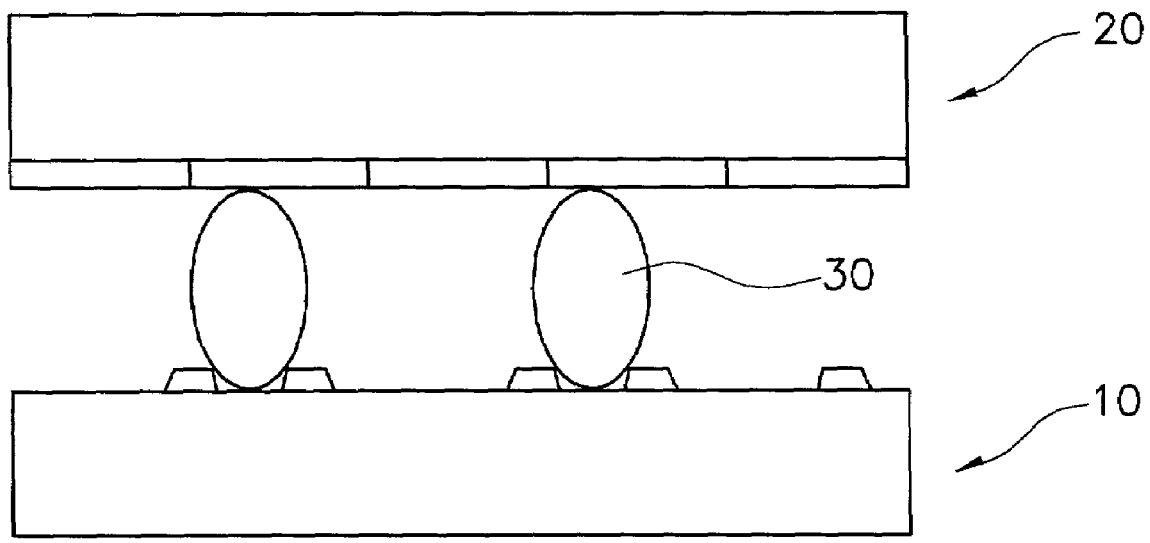
FIG. 1 is a cross-sectional view showing a conjunctional structure of lower and upper substrates in a conventional liquid crystal display device.
Figure 2:
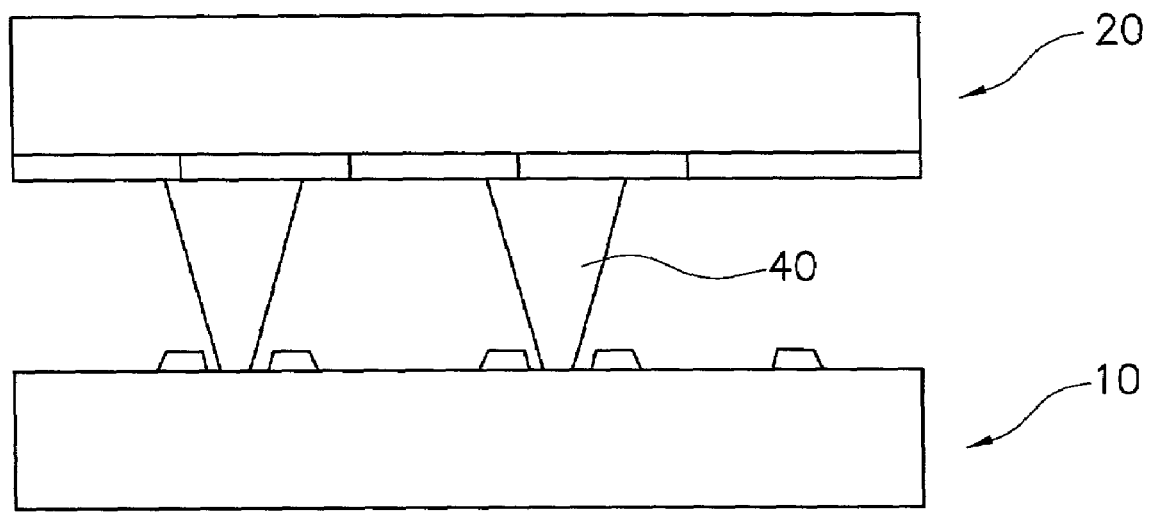
FIG. 2 is a cross-sectional view showing another conjunctional structure of lower and upper substrates in a conventional liquid crystal display device.
Figure 3:
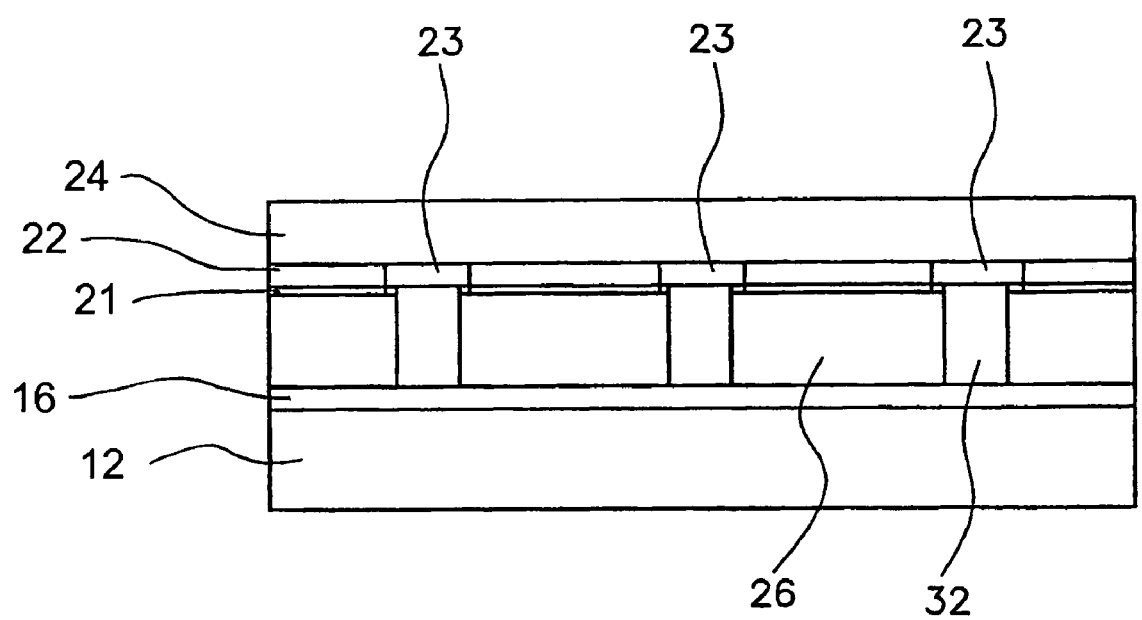
FIG. 3 is a cross-sectional view showing a constitution of a conventional liquid crystal display device.
Figure 4:
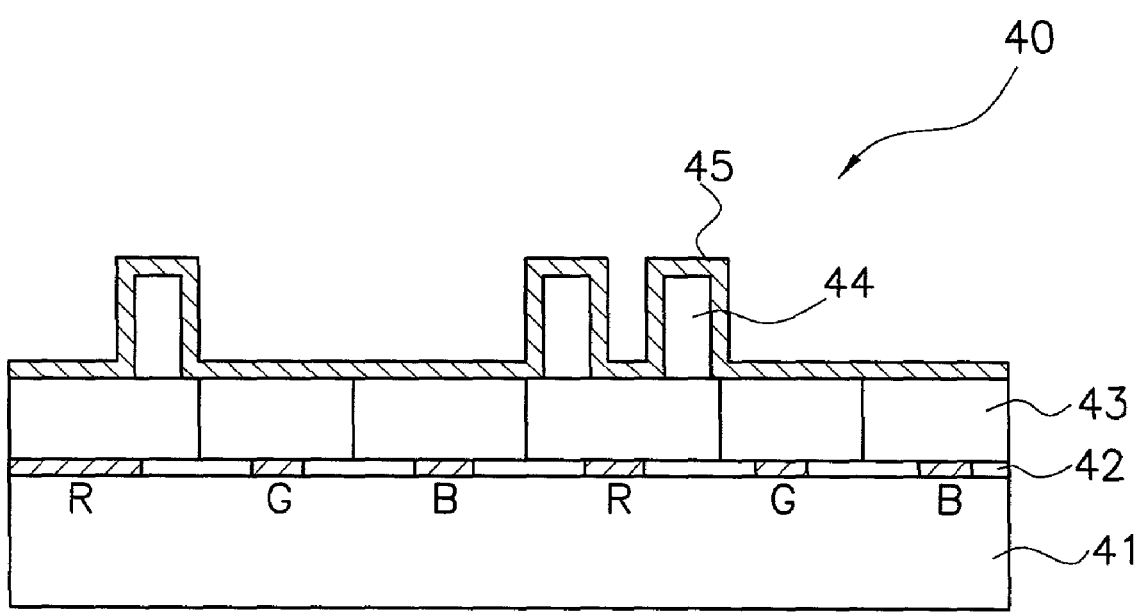
FIG. 4 is a cross-sectional view showing a structure of an upper substrate in a liquid crystal display device according to an embodiment of the present invention.

FIG. 4 is a cross-sectional view showing a structure of an upper substrate in a liquid crystal display device according to an embodiment of the present invention. Referring to FIG. 4, the upper substrate 40 usually referred as a color filter substrate is composed of a black matrix 42 formed on a glass board 41, a color filter layer 43 formed on the black matrix, a supporting column 44 formed on a portion of the color filter layer 43, and an electrically conductive layer 45 formed on surfaces of the supporting column 44 and the color filter layer 43. The conductive layer 45 is preferably formed of indium tin oxide.

The supporting column 44 is vertically extended from the upper substrate 40, thereby enabling to maintain a uniform cell gap. In addition, the conductive layer 45 covering the supporting column 44 acts as a substitute for a conventional interconnection transfer, as will be described later.

Figure 5:
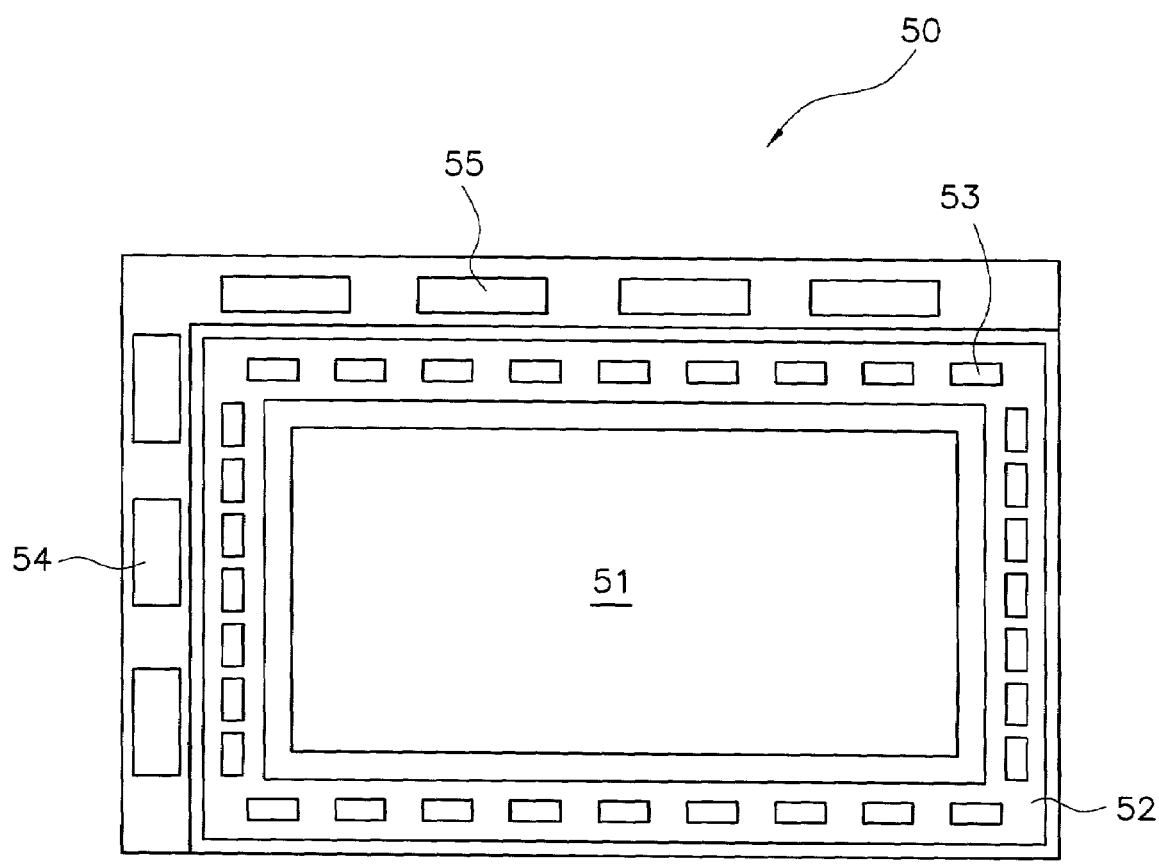
FIG. 5 is a plan view showing a structure of a lower substrate in a liquid crystal display device according to an embodiment of the present invention.

FIG. 5 is a plan view showing a structure of a lower substrate in a liquid crystal display device according to an embodiment of the present invention. As shown in FIG. 5, the lower substrate 50 usually referred as an array substrate has an active area 51 where pixels are formed, a common line 52 disposed at a peripheral region outside the active area 51, and a contact hole 53 formed on the common line 52. The lower substrate 50 confronts the upper substrate (40 in FIG. 4), while the contact hole 53 of the lower substrate 50 faces the supporting column (44 in FIG. 4) of the upper substrate.

That is, the contact hole 53 is placed at a corresponding position to the supporting column. The contact hole 53 can therefore serve as a contact part for guiding a communication between the supporting column of the upper substrate and the common line 52 of the lower substrate 50 when both substrates are joined together. The contact hole 53 is actually formed in an insulating layer 56, shown in FIG. 6, covering the common line 52. The lower substrate 50 further has a gate outer lead bonding pad 54 and a data outer lead bonding pad 55, both pads being well known in the art.

Figure 6:
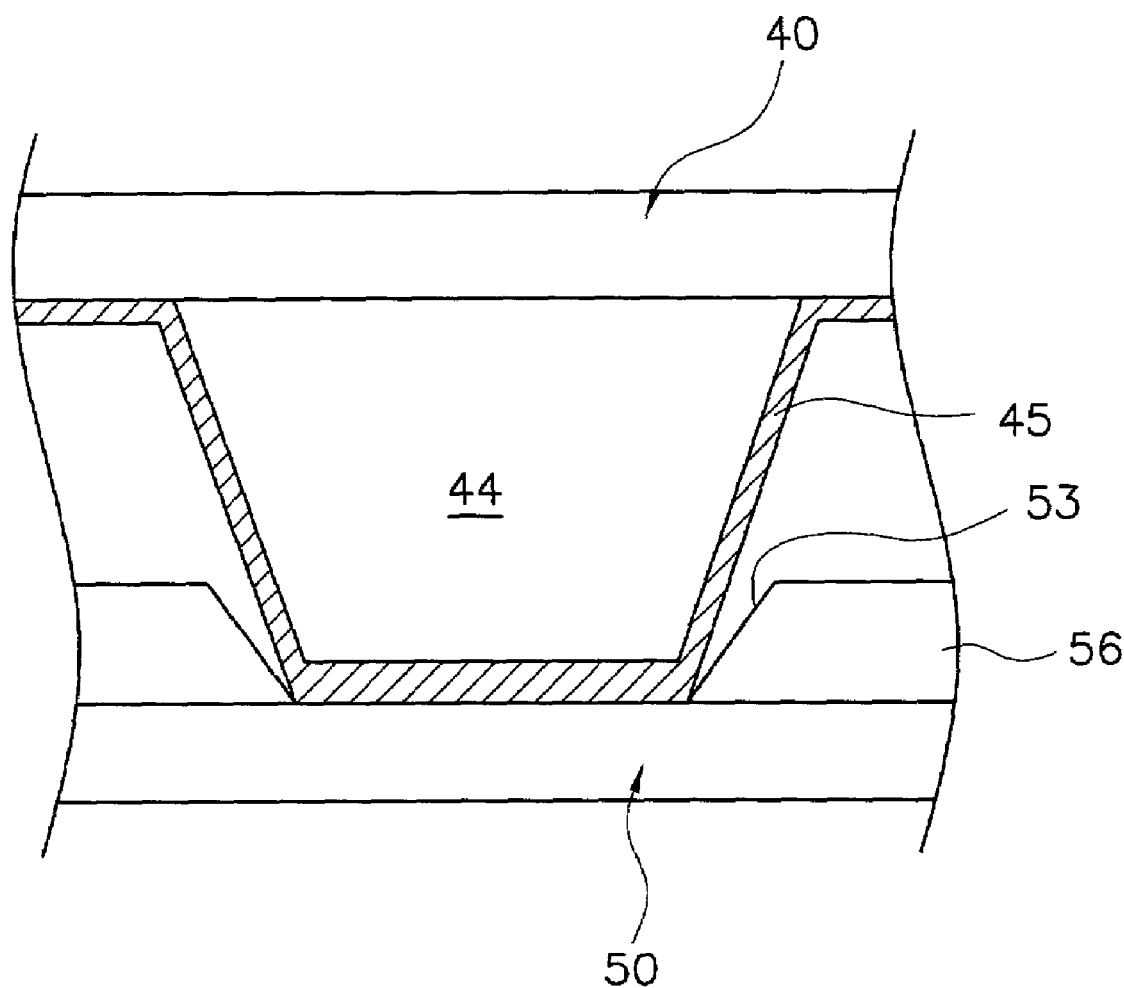
FIG. 6 is a cross-sectional view partially showing a vertical structure after a conjunction of lower and upper substrates in a liquid crystal display device according to an embodiment of the present invention.

FIG. 6 is a cross-sectional view partially showing a vertical structure after a conjunction of lower and upper substrates in a liquid crystal display device according to an embodiment of the present invention. As depicted in FIG. 6, the insulating layer 56 is formed on the lower substrate 50 and has the contact hole 53 selectively exposing the lower substrate 50. Particularly, as stated above, the contact hole 53 is located on the common line (52 in FIG. 5) of the lower substrate 50. When the upper and lower substrates 40 and 50 are united, the supporting column 44 covered with the conductive layer 45 is partially inserted into the contact hole 53. Therefore, a portion of the conductive layer 45 on the surface of the supporting column 44 is joined to the common line of the lower substrate 50 within the contact hole 53, thus enabling to establish a signal interconnection between the upper and lower substrates 40 and 50.

As fully described hereinbefore, the liquid crystal display device according to the present invention does not employ a conventional spacer ball nor a conventional interconnection transfer, but the device maintains a uniform cell gap and also realize a signal interconnection between the lower and upper substrates. As a substitute for the conventional interconnection transfer, the electrically conductive layer covering the supporting column is used. Additionally, the conductive layer covers the entire upper substrate as well as the supporting column, while uniformly existing over the peripheral region outside the active area in the LCD panel. Accordingly, the common signal is uniformly provided to each color filter region, so that undesirable cross talk is effectively prevented and the quality of the LCD screen is also improved. Furthermore, since the method of the present invention does not require a conventional dotting process for the interconnection transfer, the fabrication cost is considerably reduced.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. A liquid crystal display device having upper and lower substrates and an active area having pixels for displaying an image, the display device comprising:

a supporting column extending from the upper substrate to the lower substrate so as to maintain a uniform cell gap therebetween, said supporting column having an outer surface inclined relative to the lower substrate at a first angle, relative to the lower substrate;

a contact part having an interior surface that is inclined with respect to the lower substrate at a second angle, relative to the lower substrate, the second angle being different than the first angle, said contact part being provided for a common line disposed at a peripheral region outside the active area of the lower substrate opposite to the upper substrate, wherein the contact part faces the supporting column at a corresponding position so as to guide electrical communication between the supporting column and the common line; and an electrically conductive layer formed on the outer surfaces of the supporting column and on a corresponding outer surface of the upper substrate, wherein a portion of the electrically conductive layer on the supporting column is joined to the common line within the contact part so as to establish a signal interconnection between the lower substrate and the upper substrate.

2. The liquid crystal display device of claim 1, wherein an insulating layer is further provided for the common line, and the contact part is a contact hole formed in the insulating layer so as to expose a portion of the common line.

3. A method for fabricating a liquid crystal display device upper and lower substrates and having an active area having pixels for displaying an image, the method, comprising the steps of:

providing a supporting column extending from the upper substrate to a lower substrate so as to maintain a uniform cell gap between the upper substrate and the lower substrate, said supporting column having an outer surface inclined with respect to the lower substrate to form a first angle between the outer surface of the supporting column and the lower substrate;

forming an electrically conductive layer on the outer surface of the supporting column and on the upper substrate;

providing a contact part for a common line disposed at a peripheral region outside the active area of the lower substrate confronting the upper substrate, wherein the contact part faces the supporting column at a corresponding position and having an interior surface that is inclined with respect to the lower substrate to form a second angle between said interior surface and the lower substrate, said second angle being at different than the first angle; and uniting the lower substrate and the upper substrate so that a portion of the electrically conductive layer on the supporting column is joined to the common line within the contact part, thereby establishing a signal interconnection between the lower substrate and the upper substrate.

4. The method of claim 3, wherein the providing of the contact part includes providing an insulating layer for the common line and forming a contact hole in the insulating layer so as to expose a portion of the common line.

5. The method of claim 3, wherein the electrically conductive layer includes an indium tin oxide (ITO) layer.

* * * * *